Feb. 1, 1927.
B. J. GRIGSBY
1,615,875
DRINK MIXER
Filed June 29, 1923
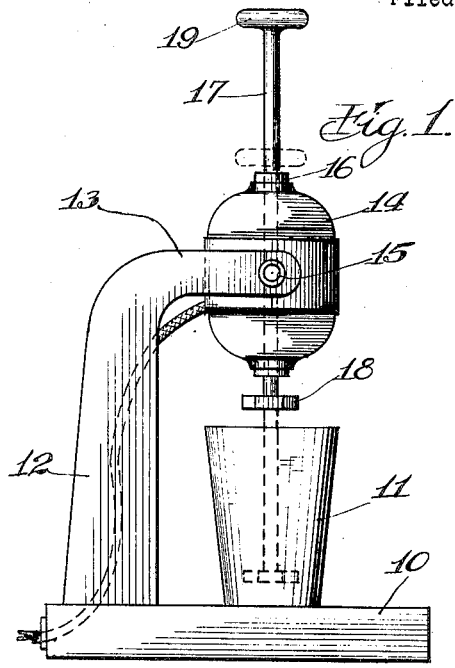
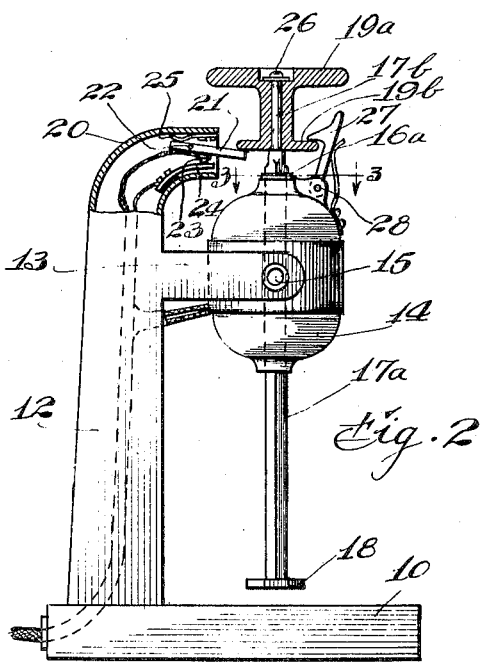
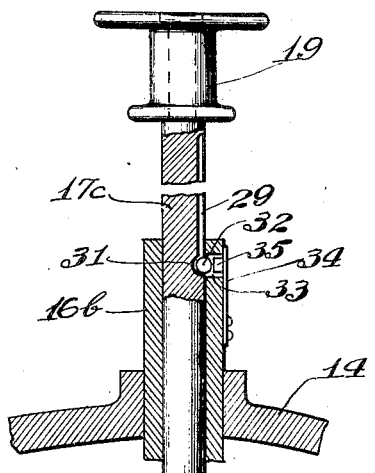
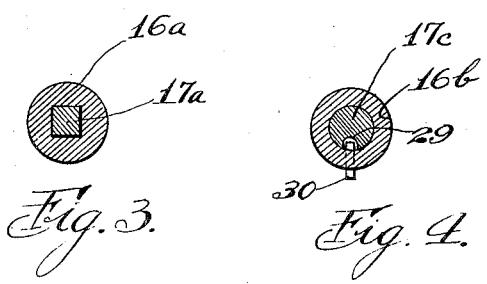
Inventor.
Bertram J. Grigsby.
By Albert E. Bell
Attorney.

Patented Feb. 1, 1927.

1,615,875

UNITED STATES PATENT OFFICE.

BERTRAM J. GRIGSBY, OF PARK RIDGE, ILLINOIS.

DRINK MIXER.

Application filed June 29, 1923. Serial No. 648,434.

My invention relates to an improvement in drink mixers used particularly where soft drinks are served and where it is necessary or desirable to thoroughly mix the several component parts of the drinks before serving to the customer.

By my invention I provide a motor, preferably of the electric type in elevated position above a base for supporting the glass or receptacle containing the drink to be mixed and hold the motor at a fixed distance from the base by means of a suitable support connecting the motor and base. The motor is provided with a hollow shaft which is rotated rapidly by the action of the motor and in the shaft I mount a rod so that it may be moved longitudinally to an upper or lower position as desired. The shaft and rod are provided with co-operating surfaces in any desired manner, for example by flattening the bore of the shaft and similarly forming the rod, by providing the rod with a keyway and shaft with a key loosely fitting it, or in any similar manner, to the end that the rod is driven by rotation of the shaft. The motor in other respects need not be essentially different from motors used in drink mixers and I do not therefore in the following description, describe the motor construction, excepting as to the hollow shaft referred to.

The longitudinally movable rod is preferably provided at its lower end with a mixing disk and at its upper end with a handle for moving the rod either up or down as desired, which handle is preferably rotatable on the rod, and I also provide devices for holding the handle and rod in their lower position and a detent for holding them in their upper position. If desired an electric switch may be employed which is operated by the handle or a projection carried by the rod in the lower position of the rod to close the circuit through the electric motor, raising the handle serving to break the circuit and interrupt the operation of the motor.

By my invention it will be observed that the distance between the motor and the base is reduced to the minimum permitted by the height of the glass or receptacle to be used with the mixer and that the relation between the motor and the base is fixed and does not change. This materially reduces the size of the device, making it neater in appearance and less in the way of other operations under conditions where space is usually valuable.

By making the mixing rod in the manner described, I entirely eliminate movable bases and movable motors and since the hollow shaft of the motor and the mixing rod may readily be made in the manner described, the construction is much simpler and cheaper to manufacture than where the motor or base or both are mounted on slides or guideways for relative vertical movement.

My invention will best be understood by reference to the accompanying drawings showing preferred embodiments of the same in which—

Fig. 1 shows one form of my device in side elevation,

Fig. 2 shows in a view similar to Fig. 1 a modified construction of my device in which an electric switch is provided for automatically controlling the operation of the motor, Fig. 3 is a sectional view of the parts shown in Fig. 2 taken along the line 3—3, Fig. 4 shows in a view similar to Fig. 3 a modified construction of hollow shaft and mixing rod, and Fig. 5 shows the upper part of a motor housing and mixing rod partially in side elevation and partially in vertical longitudinal section to show a form of detent mechanism that may be employed in the device.

Similar numerals refer to similar parts throughout the several views.

As shown in Fig. 1 my improved mixer consists of a base 10 for supporting the receptacle or glass 11 containing the drink to be mixed. From the base 10 a support 12 extends vertically, said support being provided with a laterally extending arm 13 for engaging a motor 14 and holding it in fixed relation vertically relatively to the base 10. The motor 14 is secured to the arm 13 by suitable fastening devices 15 which may be rigid, or if preferred, of the trunnion type to permit a slight rocking of the motor to facilitate placing the receptacle 10 on the base or removing it therefrom.

The motor 14 is provided with a hollow shaft 16 in the bore of which a mixing rod 17 is disposed, the relation between the rod and the bore of the shaft being such that rotation of the shaft rotates the rod. This relation may result either from the frictional engagement between the shaft and the rod, or from conforming the bore of the shaft and the rod in one way or another as subsequently illustrated, so that relative rotation between the parts is prevented without interfering with ready movement of the rod longitudinally in the shaft. The mixing rod carries at its lower end a mixing disk 18, which preferably is provided with an irregularly shaped edge for example it may be polygonal in form and of as many sides as desired to effectively engage the liquids to be mixed. The rod 17 carries at its upper end a handle 19 by which the rod may be conveniently lowered and raised as required in the operation of the device.

In the construction shown in Fig. 2, the motor 14 is mounted on the base 10 in substantially the manner above described. In this construction however, the support 12 is extended above the arm 13 to form a switch housing 20 in which an electric switch 21 is mounted, which is pivotally supported at 22 and projects from the end of the housing into the path of a projection carried by the mixing rod. The switch 21 is provided with contacts 23 and 24, insulated from the remaining parts of the device and so supported that depression of the switch 21 moves the contacts into engagement with each other and raising the switch 21, which is accomplished by a spring 25, separates said contacts. The operating circuit of the motor extends through the contacts in the manner indicated and thus the motor is started by downward movement of the mixing rod and its operation is stopped when the mixing rod is moved from a lower to an upper position.

In the construction shown in Fig. 2, the mixing rod 17ª is of flat sided conformation, for example of square cross section, although any form of flat sided construction may be employed, and the motor shaft 16ª is provided with a bore of similar conformation which is a sliding fit on the mixing rod. The upper end of the mixing rod 17ª is of reduced circular cross section as indicated at 17ᵇ, and loosely fits a bore therefor in a handle 19ª, so that the handle may rotate freely on the mixing rod. A suitable fastening device, for example a retaining screw 26, engages the upper end of the mixing rod to prevent longitudinal movement of the handle on the mixing rod. The handle 19ª is provided at its lower end with an outwardly extending disk 19ᵇ of a diameter to engage the switch 21 when the handle is in its lower position, and in this position the disk is also engaged by a spring catch 27 pivotally mounted on the motor at 28 to positively retain the mixing rod in its lower position.

As a result of the construction described, the mixing rod may be moved vertically without turning of the handle in the hand of the operator, which condition continues when the motor is automatically started by the operation of the switch 21 and the mixing rod is held in its lower position automatically by the catch described, thus maintaining the switch 21 in its closed position for as long an interval as it is desired to operate the device. At the end of the mixing operation the catch 27 is released and the rod 17ª is raised to its upper position by the handle 19ª, at which time the switch 21 moves to its alternate position under the action of the spring 25, to stop the operation of the motor.

In the construction shown in Fig. 4, the motor shaft 16ᵇ is shown as provided with a circular bore for receiving a mixing rod 17ᶜ of similar cross section and size and in this case the mixing rod is provided with a keyway 29 engaged by a key 30 carried by the shaft 16ᵇ, the fit of the key in the keyway and the fit of the rod in the shaft being loose enough to permit the ready movement of the rod longitudinally in the shaft.

In the construction shown in Fig. 5, the mixing rod 17ᶜ is of the construction shown in Fig. 4, and the keyway 29 is provided at its lower portion with an indentation 31 for receiving a portion of a ball 32 carried in an opening 33 therefor, formed in the upper end of the motor shaft 16ᵇ. The motor shaft in this case is extended somewhat beyond the motor housing 14 to support a spring 34 having a projection 35 entering the opening 33, so that said projection may rest against the ball 32. This construction constitutes a spring detent for holding the mixing rod in its upper position with sufficient positiveness to prevent the accidental dropping of the rod to its lower position when not desired, and it will further be observed that the ball also constitutes a key which may be employed to prevent relative rotation between the motor shaft and the mixing rod.

While I have shown my invention in the particular embodiments above described it will be understood that I do not limit myself to this exact construction, but that I may employ equivalents known to the art at the time of the filing of this application without departing from the scope of the appended claims.

What I claim is:

1. In a drink mixer, the combination of a motor having a hollow shaft, a base, a support for holding said motor at a fixed distance from said base, a mixing rod in said shaft and movable therein towards and away from said base, a disk carried by the upper portion of said rod, a catch for engaging said disk when said rod is in its lower position, and an electric switch operated by said disk to control said motor.

2. In a drink mixer, the combination of a motor having a hollow shaft, a base, a support for holding said motor at a fixed distance from said base, a mixing rod in said shaft and movable therein towards and away from said base, a disk carried by the upper portion of said rod, a catch for engaging said disk when said rod is in its lower position, and an electric switch operated by said disk to control said motor, said disk being rotary on said rod and prevented from moving longitudinally thereon.

3. In a drink mixer, the combination of a motor having a hollow shaft, a base, a support for holding said motor at a fixed distance from said base, a mixing rod in said shaft and movable therein towards and away from said base, a handle carried by the upper end of said rod, a stirring disk carried by the lower end of said rod, said handle being loosely connected to said rod to permit relative rotation and prevent relative longitudinal movement between said parts, a flange carried by the lower end of said handle, a catch for engaging said flange for the lower position of said rod, and an electric switch operated by said flange to control said motor.

4. In a drink mixer, the combination of a motor having a hollow shaft, a base, a support for holding said motor at a fixed distance from said base, a mixing rod in said shaft and movable therein towards and away from said base, a disk carried by the upper portion of said rod, a catch for engaging said disk when said rod is in its lower position, an electric switch operated by said disk to control said motor, and a detent for holding said rod in its upper position.

5. In a drink mixer, the combination of a motor having a hollow shaft, a base, a support for holding said motor at a fixed distance from said base, a mixing rod in said shaft and movable therein towards and away from said base, a handle carried by the upper end of said rod, a stirring disk carried by the lower end of said rod, said handle being loosely connected to said rod to permit relative rotation and prevent relative longitudinal movement between said parts, a flange carried by the lower end of said handle, a catch for engaging said flange for the lower position of said rod, an electric switch operated by said flange to control said motor, and a detent for holding said rod in its upper position.

6. In a drink mixer, the combination of a motor having a hollow shaft, a base, a support for holding said motor at a fixed distance from said base, a mixing rod in said shaft and movable therein towards and away from said base, said rod having a longitudinal keyway, and a spring detent and key carried by said shaft and engaging said keyway for holding said rod in its upper position and preventing relative rotation between said rod and said shaft.

In witness whereof, I hereunto subscribe my name this 26th day of June, A. D. 1923.

BERTRAM J. GRIGSBY.